June 13, 1967 C. C. GIRSKI 3,325,205
CAMPER FOR TOPLESS VEHICLES
Filed Aug. 16, 1965
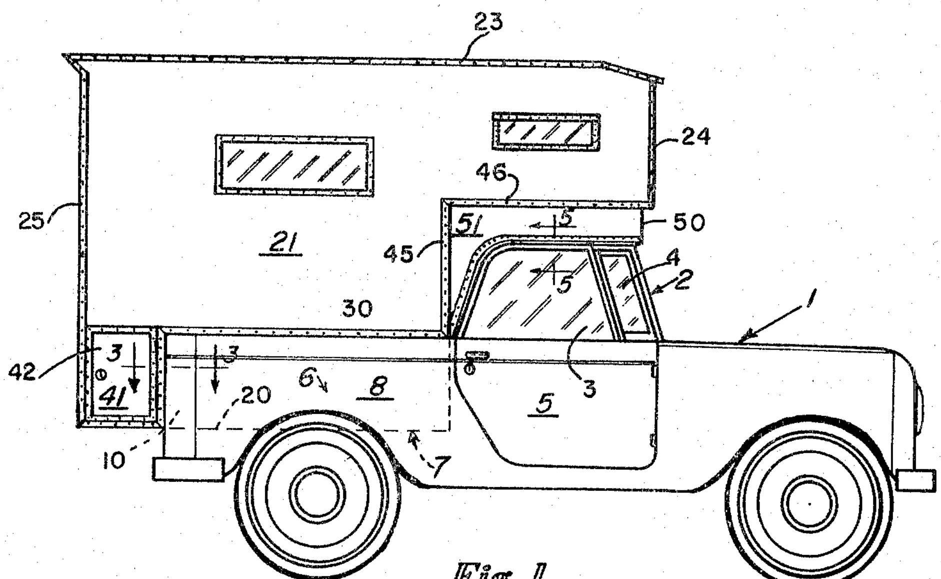
Fig. 1
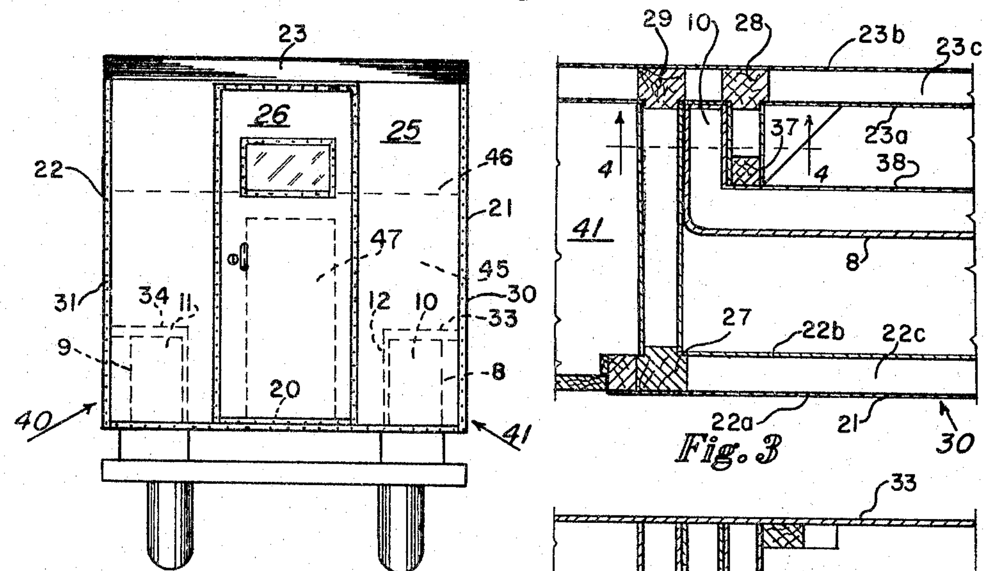
Fig. 2
Fig. 3
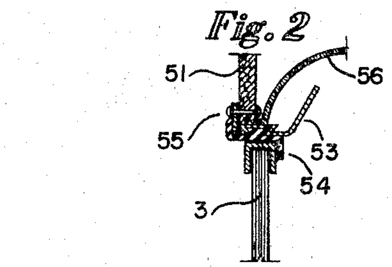
Fig. 5
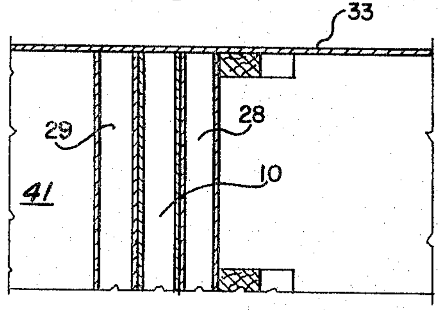
Fig. 4
INVENTOR
Charles C. Girski
BY
Attorney 3,325,205

CAMPER FOR TOPLESS VEHICLES

Charles C. Girski, 901 Cherry Lane, Pueblo, Colo. 81005

Filed Aug. 16, 1965, Ser. No. 479,962

2 Claims. (Cl. 296—23)

ABSTRACT OF THE DISCLOSURE

A removable camper for a vehicle having a windshield and at least two doors with openable windows and no top, is removably attachable to the windshield so as to form at least a cab for the driving compartment of the vehicle. A door between the driving compartment and the camper provides access between the two. For vehicles having a truck-type bed and a tailgate between two short end walls, the camper is arranged to straddle the end walls and be securely held on the vehicle.

This invention relates to removable cabs for vehicles and more particularly to camper-type removable cabs for topless self-propelled vehicles.

Camper-type cabs for such vehicles as pickup trucks and similar vehicles have gained considerable popularity in recent years. Such camper cabs are usually equipped with a stove, an ice-box, a sink and water supply, and at least one bed to provide for living facilities of the occupant. In a few instances the cabs are essentially bare merely providing a cover for the truck box. The truck configuration usually permits the removable cab to sit in the truck box and some are tall enough to provide an overhang which extends over the truck cab itself. Also, four-wheel drive vehicles with a smaller type of truck box, of the Scout class manufactured by International Harvester Co., have become quite popular, however, they are usually too small to support the normal camper.

According to the present invention is provided a camper for topless vehicles having an attached windshield, in which the camper is arranged for attachment to the vehicle and attachment to the windshield so that the camper forms a cabin for the driver's compartment. Thus the camper becomes an integral part of the vehicle but is removable where desired. The arrangement provides means for a direct internal access between the vehicle driver's compartment and the inside of the cab without resorting to alighting from the vehicle, walking around to the back and mounting the camper cab.

Included among the objects and advantages of the invention is to provide a camper-type cab for topless vehicles.

Another object of the invention is to provide a camper-type cab for topless vehicles in which the cab is attached to and becomes a part of the vehicle forming an enclosed driver's compartment for the vehicle.

A further object of the invention is to provide a camper-type cab for topless vehicles in which an access door is provided between the driver's compartment of the vehicle and the interior of the camper cab.

Another object of the invention is to provide a camper-type cab for topless vehicles with a unique mounting arrangement which prevents accidental loss of the camper from the vehicle.

These and other objects and advantages of the invention may be readily ascertained by referring to the following description and appended illustrations in which:

FIG. 1 is a side elevational view of a camper according to the invention mounted on a topless vehicle;

FIG. 2 is a rear elevational view of the vehicle of FIG. 1;

FIG. 3 is a partial detail in cross-section of a portion of the camper mounted on the truck bed taken along section line 3—3 of the device of FIG. 1;

FIG. 4 is a cross-sectional view of the detail of the device of FIG. 3 taken along section line 4—4 of the view of FIG. 3 and;

FIG. 5 is a sectional view of the attachment of the cab to the vehicle taken along section lines 5—5 of FIG. 1.

In the device illustrated in the drawings a topless vehicle 1, which is normally of the Scout-type which has a removable top leaving a windshield 2, side windows 3 with an accompanying side vent window 4 both of which extend above a door body 5. A truck bed or box 6 is integral with the body and in the absence of seats provides a short bed usable as a truck bed. Such vehicles have several types of removable cabs. A floor 7 of the truck bed is approximately planar and the floor has upwardly extending sides 8 on one side and 9 on the other. The side 8 has a short lateral extension or wrap-around corner 10 at the rear end of the bed and the other side has a similar lateral extension 11 providing an opening at the rear of a truck body, which is arranged to be closed by a removable tailgate. With this type of vehicle the opening for the tailgate is of less lateral width than the truck box itself. Additionally, the vehicle is provided with the usual driver's compartment with doors, one door 5 being shown on the left side and a similar door not shown on the opposite side, with one or more seats, steering wheel and normal accessories for driving such a vehicle.

The camper of the invention is arranged with a floor portion 20 arranged to rest on the truck box portion floor portion 7, and it is provided with upright side walls 21 on one side and 22 on the other side. A top 23 is secured to the walls. A front wall 24 above the cab encloses the top front of the camper and a back wall 25, provided with a door 26, encloses the rear portion of the camper completing the enclosure. The side walls, front walls, top walls, and rear walls are of normal camper-type construction which includes an outer skin **22*a*, FIG. 3, and inner skin 22*b* and a space 22*c* for insulation. An upright 27, one of many, provides structural strength for the walls. An inner wall, fitting inside the truck box includes outer skin 23*a* and inner skin 23*b* with an insulating space 23*c* therebetween. Uprights 28 and 29 provide bracing means for the inner wall, there being similar braces throughout the construction for strength and as is conventional. The camper has an overhang 30 over the side 8 of the vehicle and an overhang 31 over the side 9 oppositely of the side 8, to provide additional room for the occupants. The overhanging portions produce internal shoulders or shelves 33 on one side and 34 on the other side which seat over the wall of the truck bed. The shelves provide seats inside the camper and are normally covered with materials which will provide cushions that make out into a bed. At the rear of each shelf is a compartment, i.e., compartment 42**, which may be used for storage, etc.

A recess in the side overhang is formed by means of an upright 37 which provides a brace for the inner wall 38 so as to accommodate the wrap-around wall portion 10, the same being provided on both sides. This provides a positive stop to prevent the camper from moving rearwardly of the vehicle. The storage compartment 40 is closed by a door 42 for supplies and in one instance a water container. While the drawing shows access from the outside, it is obvious that access may be had from the interior by putting a door on the interior wall.

An interior front wall 45 in the camper, near the front, provides a back wall for the driver's compartment of the vehicle. An upper horizontal wall 46 provides a roof for the driver's compartment, and in the space thereabove a bed may be placed or it may be used as a storage compartment as desired. A door 47 in the wall 45 provides access between the camper and the vehicle cab. Normally the vehicle has bucket seats so that a pathway is provided between the two seats to the door 47.

The extension of the camper cab extends over the driving compartment and provides a roof therefor. The front 50 is bolted to the windshield frame 2, in place of a removable top, and sides 51 frame the window of the doors. The frame 51, FIG. 5, includes an inner frame member 53 having a rubber gasket 54 secured to it by means of fasteners 55 against which the window 3 seats, forming a tight seal therewith. The inside top of the driver's compartment may be covered with a fabric 56 to complete the same or the wall 46 may be left plain or painted.

The door 47 may be a split or Dutch door to provide access to the driving compartment through the wall 46 and to provide ventilation. Further, the door aids in rear vision since the rear door normally has a window and in some cases a full length window.

The camper cab of the invention may be secured to the vehicle by bolts and like along the sides, not shown, in addition to the bolts attaching the windshield frame to the front 50. The notched section fitting over the tailgate wall, also, prevents longitudinal movement of the cab and securely holds the same in position on the vehicle.

While the invention has been illustrated with reference to particular embodiment there is no intent to limit the spirit or scope of the invention precise details so set forth except as defined in the following claims.

I claim:

1. The combination of a removable camper and a topless self-propelled vehicle having an upstanding windshield, side windows and a weight-supporting floor area, said removable camper comprising a cabin-like enclosure having floor means resting on a portion of said weight-supporting areas of said vehicle; an overhanging portion of said enclosure extending over the driving compartment of said vehicle and contacting said windshield and providing a forwardly extending enclosure portion; means for temporarily attaching said overhanging portion on said windshield; means depending downwardly from said overhanging portion arranged to mate with said side windows and cooperatively forming with said overhanging portion, said windows and said windshield an enclosure for said driving compartment; means inclusive of a notched portion fitting over a lateral portion of said vehicle for maintaining said camper on said vehicle; passenger access means from the exterior to the interior of said camper; and passenger access means inclusive of a door between said camper and the driving compartment of said vehicle.

2. The combination of a removable camper and a topless self-propelled vehicle having an upstanding windshield, side windows and a weight-supporting floor area, said removable camper comprising a cabin-like enclosure having floor means resting on a portion of said weight-supporting area of said vehicle; a forwardly depending overhanging portion of said enclosure extending over the driving compartment of said vehicle, said overhanging portion contacting said windshield and providing a forwardly extending enclosure portion above said driving compartment; means for temporarily attaching said overhanging portion on said windshield; wall means depending downwardly from said overhanging portion arranged to mate with said side windows and cooperatively forming with said overhanging portion, said side windows and said windshield an enclosure for said driving compartment; means inclusive of a notched portion on each side of said enclosure fitting over opposed lateral portions on each side of said vehicle for maintaining said camper on said vehicle; passenger access means at the rear of said camper; and passenger access means inclusive of a door between said camper and the driving comparment of said vehicle.

References Cited

UNITED STATES PATENTS

| | | | |
|---|---|---|---|
| 1,715,221 | 5/1929 | Carpenter. | |
| 1,984,681 | 12/1934 | Jackson | 296—23 |
| 2,307,172 | 1/1943 | Van Hooser | 296—23 |
| 3,123,393 | 3/1964 | Markwick | 296—23 |

BENJAMIN HERSH, *Primary Examiner*.

PHILIP GOODMAN, *Examiner*.